United States Patent
Guo et al.

(10) Patent No.: US 10,659,996 B2
(45) Date of Patent: May 19, 2020

(54) RADIO RESOURCE MANAGEMENT IN METROPOLITAN AREA NETWORKS

(71) Applicant: Northwestern University, Evanston, IL (US)

(72) Inventors: Dongning Guo, Chicago, IL (US); Zhiyi Zhou, Chicago, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 0 days.

(21) Appl. No.: 16/146,276

(22) Filed: Sep. 28, 2018

(65) Prior Publication Data
US 2019/0104441 A1 Apr. 4, 2019

Related U.S. Application Data

(60) Provisional application No. 62/565,681, filed on Sep. 29, 2017.

(51) Int. Cl.
*H04W 28/26* (2009.01)
*H04W 28/02* (2009.01)
(Continued)

(52) U.S. Cl.
CPC ........... *H04W 28/26* (2013.01); *H04W 16/12* (2013.01); *H04W 28/0236* (2013.01); *H04W 28/16* (2013.01); *H04W 52/244* (2013.01); *H04W 52/34* (2013.01); *H04W 52/386* (2013.01); *H04W 72/0453* (2013.01); *H04W 72/0473* (2013.01); *H04W 72/0486* (2013.01); *H04W 72/085* (2013.01); *H04W 88/12* (2013.01)

(58) Field of Classification Search
CPC .............................. H04W 28/16; H04W 92/12
See application file for complete search history.

(56) References Cited

U.S. PATENT DOCUMENTS 9,025,446 B2 * 5/2015 Huang .................... H04L 5/001
370/229
2007/0091983 A1 * 4/2007 Siriwongpairat .. H04B 1/71632
375/130

(Continued)

OTHER PUBLICATIONS

The Non-Final Office Action issued in U.S. Appl. No. 15/900,966 dated Aug. 22, 2019, pp. 1-18.

(Continued)

*Primary Examiner* — Melanie Jagannathan
(74) *Attorney, Agent, or Firm* — Bell & Manning LLC (57) ABSTRACT

A system for allocating resources in a communications network includes a plurality of access points and a central controller in communication with the plurality of access points. Each access point in the plurality of access points is in communication with one or more user devices. The central controller is configured to receive traffic information and channel information for access point—user device links in the communications network. The central controller is also configured to determine a joint resource allocation based at least in part on the received traffic and channel information and at least in part on an algorithm. The central controller is further configured to transmit the joint resource allocation to the plurality of access points, where the joint resource allocation comprises spectrum allocation, user association, and power allocation.

19 Claims, 7 Drawing Sheets

(51) Int. Cl.
*H04W 52/34* (2009.01)
*H04W 72/04* (2009.01)
*H04W 16/12* (2009.01)
*H04W 28/16* (2009.01)
*H04W 52/38* (2009.01)
*H04W 52/24* (2009.01)
*H04W 88/12* (2009.01)
*H04W 72/08* (2009.01)

(56) References Cited

U.S. PATENT DOCUMENTS

| | | | | |
|---|---|---|---|---|
| 2009/0181694 | A1* | 7/2009 | Byun | H04W 36/22 455/453 |
| 2009/0257387 | A1* | 10/2009 | Gholmieh | H04L 5/0053 370/329 |
| 2010/0248730 | A1* | 9/2010 | Han | H04W 16/10 455/450 |
| 2011/0029347 | A1 | 2/2011 | Kozat et al. | |
| 2011/0312363 | A1* | 12/2011 | Kolding | H04B 7/024 455/513 |
| 2012/0236774 | A1* | 9/2012 | Guey | H04W 28/16 370/312 |
| 2013/0137447 | A1* | 5/2013 | Zhang | H04W 72/082 455/452.1 |
| 2013/0316722 | A1 | 11/2013 | Bader | |
| 2014/0044061 | A1* | 2/2014 | Yue | H04W 72/042 370/329 |
| 2014/0106802 | A1* | 4/2014 | Cheng | H04W 72/12 455/509 |
| 2016/0150526 | A1* | 5/2016 | Koudouridis | H04W 72/0413 370/329 |
| 2017/0188381 | A1* | 6/2017 | Lopes Batista | H04W 8/005 |

OTHER PUBLICATIONS

Cisco Visual Networking Index: Global Mobile Data Traffic Forecast Update, 2013-2018, Cisco, San Jose, CA, USA, Feb. 2013, pp. 1-34.
Chen et al., "The Impact of Unlicensed Access on Small-Cell Resource Allocation," IEEE INFOCOM, San Francisco, CA, Apr. 2016, pp. 1-18.
Shen et al., "Fractional Programming for Communication Systems—Part I: Power Control and Beamforming," submitted to IEEE Trans. Signal Process., 2017, pp. 1-15.
Teng et al., "Resource Management in 5G: A Tale of Two Timescales," in Proc. Asilomar Conference on Signals, Systems, and Computers, Pacific Grove, CA, USA, 2015, pp. 1041-1045.
Zhou et al., "Allocation of Licensed and Unlicensed Spectrum I n Heterogeneous Networks," in Proc. IEEE Australian Communication Theory Workshop, Melbourne, VIC, Australia, 2016, pp. 59-64.
Etkin et al., "Spectrum Sharing for Unlicensed Bands," in IEEE Journal on Selected Areas in Communications, Apr. 2007, vol. 25, No. 3, pp. 517-528.
Chang et al., "Multicell OFDMA Downlink Resource Allocation Using a Graphic Framework," IEEE Transactions on Vehicular Technology, Sep. 2009, vol. 58, No. 7, pp. 3494-3507.
Kuang et al., "Energy Management in Heterogeneous Networks with Cell Activation, User Association, and Interference Coordination," IEEE Transactions on Wireless Communications, Jun. 2016, vol. 15, No. 6, pp. 3868-3879.
Zhou et al., "1000-Cell Global Spectrum Management," ACM MobiHoc 2017, Chennai, India, 2017, pp. 1-10.
Shen et al., "Fractional Programming for Communication Systems—Part II: Uplink Scheduling via Matching," submitted to IEEE Trans. Signal Process., 2017, pp. 1-14.
Zhuang et al.: "Scalable Spectrum Allocation and User Association in Networks with Many Small Cells," IEEE Trans. Commun., 2017, vol. 65, pp. 1-31.
Kuang et al., "Optimal joint user association and multipattern resource allocation in heterogeneous networks," IEEE Trans. Sig. Proc., Jul. 1, 2016, vol. 64, pp. 3388-3401.
Stolyar et al., "Self-organizing dynamic fractional frequency reuse in OFDMA systems," IEEE INFOCOM, Phoenix, USA, Apr. 2008, pp. 1364-1372.
Ali et al., "Dynamic frequency allocation in fractional frequency reused OFDMA networks," IEEE Trans. Wireless Commun., Aug. 2009, vol. 8, pp. 4286-4295.
Madan et al., "Cell association and interference coordination in heterogeneous LTE-A cellular networks," IEEE J. Sel. Areas Commun., Dec. 2010, vol. 28, No. 9, pp. 1479-1489.
Ye et al., "User association for load balancing in heterogeneous cellular networks," IEEE Trans. Wireless Commun., Jun. 2013, vol. 12, No. 6, pp. 2706-2716.
Shen et al., "Distributed pricing-based user association for downlink heterogeneous cellular networks," IEEE J. Sel. Areas Commun., Jun. 2014, vol. 32, No. 6, pp. 1100-1113.
Huang et al., "Joint scheduling and resource allocation in uplink OFDM systems for broadband wireless access networks," IEEE J. Sel. Areas Commun., Feb. 2009, vol. 27, pp. 226-234.
Fooladivanda et al., "Joint resource allocation and user association for heterogeneous wireless cellular networks," IEEE Trans. Wireless Commun., Jan. 2013, vol. 12, No. 1, pp. 248-257.
Lim et al., "Energy-efficient resource allocation for OFDMA-based multi-RAT networks," IEEE Trans. Wireless Commun., May 2014, vol. 13, No. 5, pp. 2696-2705.
Deb et al., "Algorithms for enhanced inter-cell interference coordination (eICIC) in LTE HetNets," IEEE/ACM Trans. Netw., Feb. 2014, vol. 22, No. 1, pp. 137-150.
Liao et al., "Base station activation and linear transceiver design for optimal resource management in heterogeneous networks," IEEE Trans. Signal Process., Aug. 1, 2014, vol. 62, No. 15, pp. 3939-3952.
Ao et al., "An efficient approximation algorithm for online multitier multi-cell user association," in Proc. ACM MobiHoc, Paderborn, Germany, Jul. 4, 2016, pp. 281-290.
Teng et al., Dual-timescale spectrum management in wireless heterogeneous networks, arXiv:1604.02781v1, Apr. 1, 2016, pp. 1-30.
3GPP TR 36.814, "Further advancements for E-UTRA physical layer aspects (Release 9)," V9.0.0, Mar. 2010.
Frank et al., "An algorithm for quadratic programming,", 1956, vol. 3, No. 1-2, pp. 95-110.
Zhuang et al., "Traffic-driven spectrum allocation in heterogeneous networks," IEEE J. Sel. Areas Commun., May 20, 2015, vol. 33, No. 10, pp. 2027-2038.
Zhuang et al., "Energy-efficient cell activation, user association, and spectrum allocation in heterogeneous networks," IEEE J. Sel. Areas Commun., Apr. 2016, vol. 34, No. 4, pp. 823-831.
Rebato, et al., "Hybrid Spectrum Sharing in mmWave Cellular Networks," IEEE transactions on Cognitive Communications and Networking, Jun. 2017, vol. 3, No. 2, pp. 155-168.

* cited by examiner

FIG. 1

| Parameters | Value/Function |
|---|---|
| AP transmit power | 23 dBm |
| Total bandwidth | 10 MHz |
| Average packet length | 0.5 Mbits |
| AP to UE pathloss (LOS) | $30.18 + 26.7 \log_{10}(R)$ |
| AP to UE pathloss (NLOS) | $34.53 + 38 \log_{10}(R)$ |
| Lognormal shadowing standard deviation (LOS) | 4 dB |
| Lognormal shadowing standard deviation (NLOS) | 10 dB |

RADIO RESOURCE MANAGEMENT IN METROPOLITAN AREA NETWORKS

CROSS-REFERENCE TO RELATED APPLICATION

The present application claims the priority benefit of U.S. Provisional Patent App. No. 62/565,681 filed on Sep. 29, 2017, the entire disclosure of which is incorporated herein by reference.

BACKGROUND

Recent years have witnessed an explosion of mobile data traffic due to proliferation of smart terminals (e.g., smart phones and tablet personal computers) and increasing use of mobile applications. It is predicted that global mobile data traffic will increase eightfold between 2015 and 2020. Wireless operators are investing heavily in infrastructure, including increasingly denser deployment of access points (APs) to improve cellular coverage and capacity for homes and businesses in urban, suburban, as well as rural areas.

SUMMARY

An illustrative system for allocating resources in a communications network includes a plurality of access points and a central controller in communication with the plurality of access points. Each access point in the plurality of access points is in communication with one or more user devices. The central controller is configured to receive traffic information and channel information for access point—user device links in the communications network. The central controller is also configured to determine a joint resource allocation based at least in part on the received traffic and channel information and at least in part on an algorithm. The central controller is further configured to transmit the joint resource allocation to the plurality of access points, where the joint resource allocation comprises spectrum allocation, user association, and power allocation.

An illustrative method for allocating resources in a communications network includes receiving, by a central controller and from a plurality of access points in communication with the central controller, traffic information and channel information for access point—user device links in a communications network. Each access point in the plurality of access points is in communication with one or more user devices. The method also includes determining a joint resource allocation based at least in part on the received traffic and channel information and at least in part on an algorithm. The method further includes transmitting the joint resource allocation to the plurality of access points, where the joint resource allocation comprises spectrum allocation, user association, and power allocation.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Described herein is a centralized radio resource management system for metropolitan area networks with a large number of access points (APs) and user equipments (UEs) or user devices. Conceived for a moderate timescale (seconds to minutes), a non-convex infinite-size problem is first formulated to allow for highly flexible spectrum allocation, user association, and power control according to large-scale channel and traffic conditions. A scalable reformulation of the problem is obtained by exploiting the sparse structure of the optimal solution. An efficient algorithm is also proposed to solve the reformulated problem with guranteed convergence. Moreover, each iteration is performed in closed form, which makes centralized resource allocation practical for networks with thousands of APs and UEs. Numerical results show that the proposed scheme yields a significantly improved throughput region and a reduced average packet delay as compared to conventional schemes.

Wireless systems have emerged as a ubiquitous part of modern data communication networks. Demand for these systems continues to grow as applications involving both voice and data expand beyond their traditional wireline service requirements. In order to meet the increasing demand in data rates, a large number of access points (APs) have been deployed to provide improved cellular coverage, capacity, and applications for homes and businesses, as well as metropolitan and rural public spaces. These APs may be densely deployed and may also utilize additional spectrum resources, such as unlicensed spectrum resources, high-frequency spectrum resources, etc. Each AP can be in the form of a computing device that includes a processor, a memory, a transceiver, etc.

Due to limited resources in current wireless networks, efficient resource allocation (e.g., spectrum allocation, power control, link scheduling, routing, and congestion control) is important in achieving high performance and providing satisfactory quality-of-service (QoS). Conventional spectrum allocation schemes include full spectrum reuse, partial frequency reuse, and fractional frequency reuse. However, the spectrum is either under-utilized or over-utilized under these traditional schemes, resulting in either low spectral efficiency or strong link interference. Moreover, these schemes are not traffic-aware in that they are not adaptive to different traffic conditions. Considering the user association schemes used in the industry, most of the existing schemes are based on simple heuristics which waste precious system capacity and lead to suboptimal performance, while offering no performance guarantees. For example, by default, in today's cellular and Wi-Fi networks users simply associate with the base station from which they receive the strongest signal. Power control is another way of mitigating inter-cell interference as well as saving energy. Instead of letting each AP always transmit using full power, some enhanced inter-cell interference coordination (eICIC) techniques, such as the almost blank subframe (ABS) control, have been proposed in long term evolution (LTE) and long term evolution advanced (LTE-A) networks. However, these types of distributed algorithms often compromise global optimality for the overall network.

Resource allocation in wireless networks has been extensively studied over the last few decades. Spectrum allocation schemes are basically designed either from an economic perspective or from a technical perspective As for the user association problem, NP-hard non-convex integer programming problems are often formulated. However, these problems make it difficult to obtain a local optimum, and extremely difficult to obtain a global optimum. Similar to the user association problem, optimal power control can also be a hard non-convex optimization problem due to the complicated interference coupling between links. Most power control algorithms are designed in a distributed manner. This is especially the case for the power control problem in a large-scale network with hundreds or even thousands of APs. However, this is at the sacrifice of system performance since distributed algorithms typically do not achieve the global optimum.

The present system addresses the preceding problems by proposing a centralized optimization-based framework for resource allocation. Unlike traditional systems, the proposed framework is able to jointly solve the problems of spectrum allocation, user association, and power control for networks with thousands of APs. An efficient algorithm with low complexity is proposed herein to obtain a near-optimal allocation solution. One key distinction of the problem formulation described herein is that, instead of assuming all APs always transmit using full power, each AP is allowed to apply a continuous power spectral density over the entire band, i.e., the size of the problem of power allocation at each AP has already grown to infinity.

The present system is the first to propose centralized joint spectrum allocation, user association, and power allocation for very large networks with thousands of APs and UEs. This is accomplished in part by formulation of a non-convex infinite-size joint spectrum allocation, user association, and power allocation problem (considering any arbitrary concave utility function), and reformulating this problem into an optimization problem with finite size which is amenable to a highly efficient algorithm. In order to solve the reformulated problem, an efficient algorithm which is guranteed to converge is proposed. Moreover, each iteration is performed in closed form, which makes centralized resource allocation practically feasible, even for a very large network. As discussed in more detail below, numerical results show that the proposed resource allocation scheme yields a significantly improved throughput region and reduced average packet delay as compared with conventional schemes.

Figure 1:
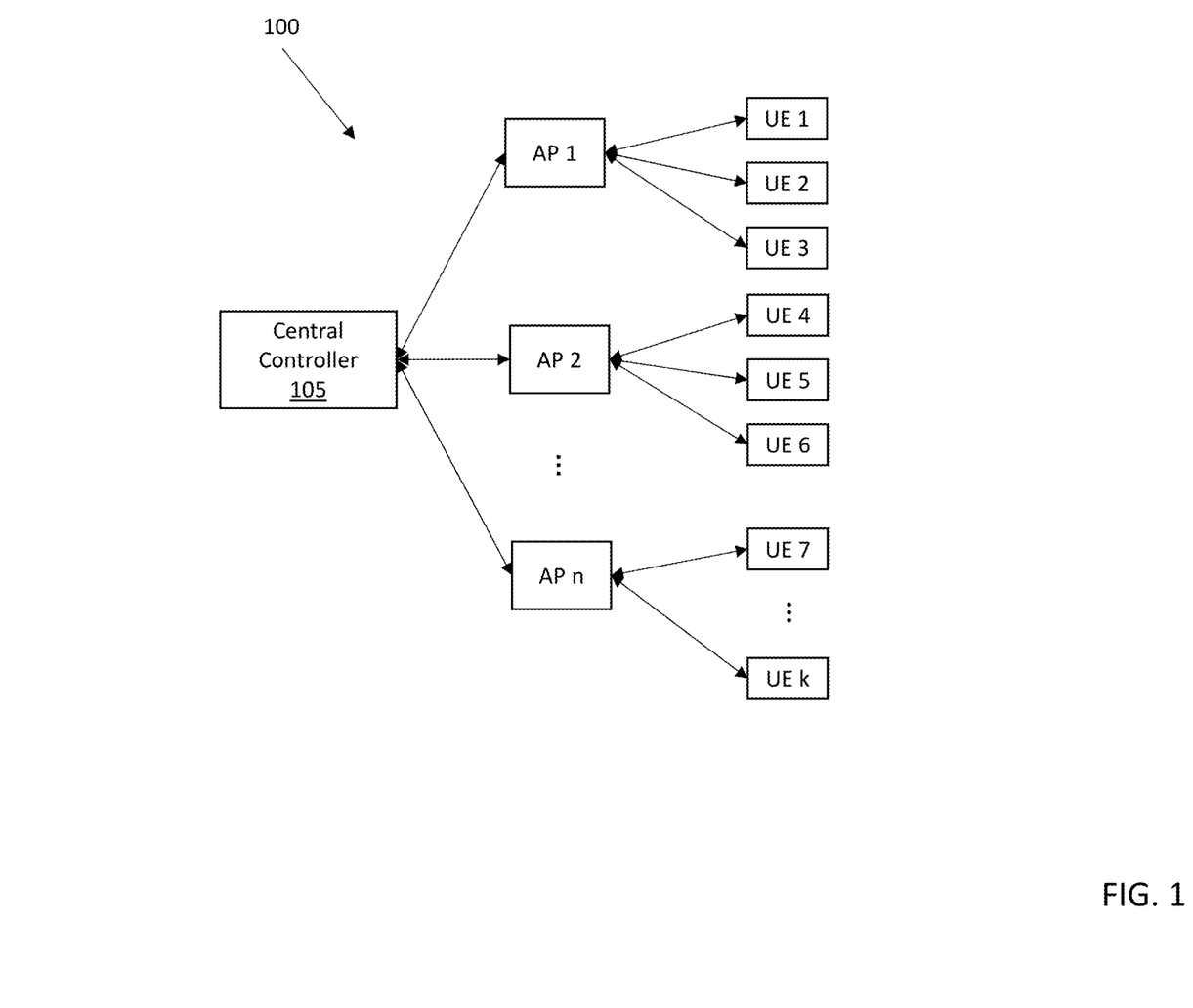
FIG. 1 depicts a network in accordance with an illustrative embodiment.

In an illustrative embodiment, a network can include n APs and k UEs. FIG. 1 depicts a network 100 in accordance with an illustrative embodiment. As depicted, the network includes n APs and k UEs, where n and k can be any number. In an illustrative embodiment, each of the APs is a computing device that includes a processor, a memory, a transceiver, an interface, etc. The APs can also include software/algorithms stored on the memory and used to perform any of the AP operations described herein. Each of the APs is in communication with a plurality of UEs. Each of the UEs can be a smart phone, tablet, or other network device that includes a processor, memory, transceiver, interface, etc.

The network 100 also a central controller 105 in communication with the APs. The central controller 105 can also be a computing device that icnludes a processor, memory, transceiver, and interface. Software and/or algorithms can be stored on the memory of the central controller 105 and used to implement any of the central controller operations described herein. In an illustrative embodiment, the central controller 105 is in communication with all APs, and collects traffic and channel/interference for all AP-UE links over time. The central controller 105 can also be informed of the intensity of independent homogeneous Poisson traffic intended for every UE by the APs. Given a spectrum resource of a certain bandwidth, one task of the central controller 105 is to allocate resources in order to maximize the long-term network utility. The allocated resources include, but are not limited to, power allocation, specturm allocation, and user association.

In one embodiment, resource allocation can be performed on a slow timescale, which is conceived to be once every few seconds or minutes based on current computational power available to most devices. This makes information exchange (channel state information feedback) and joint resource allocation viable at the central controller 105. In addition, since a period of slow-timescale resource allocation is much longer than the channel coherence time, the average channel conditions can be accurately modeled and measured using path loss and the statistics of small scale fading. The frequency resources are assumed to be homogeneous on a slow timescale.

The set of AP indexes can be denoted by $N=\{1, \ldots, n\}$ and the set of UE indexes denoted by $K=\{1, \ldots, k\}$. Arbitrary association is allowed such that each AP can simultaneously serve any subset of UEs, and each UE can be simultaneously served by any subset of APs. The power constraint can be on the (transmit) power spectral density (PSD) of individual APs. The spectrum allocation is integrated into the frequency-selective power allocation, as choosing a subset of APs to transmit over a certain part of the spectrum is equivalent to allocating positive transmit power to these APs and zero power to others over that part of the spectrum.

When a receiver decodes information from a transmitter, it can be assumed that the receiver treats signals from all other transmitters as additive white Gaussian noise. Allocating more spectrum and/or power to a given AP-UE link will thus improve the throughput of this given link at the expense of additional interference to other links. The allocation problem then can be viewed as determining the PSDs of all AP-UE links over the entire spectrum in order to maximize the network utility. For convenience, the entire frequency band can be thought of as one unit. The PSD of a link from AP i to UE j can be denoted as $p_{i \to j}(f)$, $f \in [0,1]$, and the PSDs of all links can be denoted by a vector $p(f)=(p_{i \to j}(f))_{i \in N, j \in K}$. It can also be assumed that an AP serves at most one UE over each slice of the spectrum, resulting in the following constraint:

$$\sum_{j \in K} |p_{i \to j}(f)|_0 \leq 1, \forall i \in N, \forall f \in [0,1]. \qquad \text{Eq. 1}$$

Nevertheless, each AP can serve multiple UEs over different slices of the spectrum. Assuming Eq. 1 is satisfied, power constraints on the APs can be written as:

$$p_{i \to j}(f) \geq 0, \forall\, i \in N, j \in K, \forall\, f \in [0,1]. \quad \text{Eq. 2}$$

$$\left(\sum_{j \in K} \int_0^1 [p_{i \to j}(f)]^\alpha\right)^{\frac{1}{\alpha}} \leq P_{max}, \forall\, i \in N, \forall\, f \in [0,1]. \quad \text{Eq. 3}$$

Equation 3 can be generalized to many different types of power constraints by tuning different $\alpha \geq 1$. For example, when $\alpha=1$, it constrains the total power of each AP over the entire spectrum, and when $\alpha \to \infty$, it constrains the PSD of each AP over each hertz. Given p(f), the service rate to UE j contributed by AP i can be calculated as:

$$r_{i \to j} = \int_0^1 s(p(f))f, \quad \text{Eq. 4:}$$

where s( ) is the general instantaneous rate function.

For purposes of the network system described herein, s( ) can be written as a function involving fractional (or ratio) terms, as indicated in Eq. 5 below:

$$s(p(f)) = q\left(\frac{A(p(f))}{B(p(f))}\right), \quad \text{Eq. 5}$$

where A( ) is a nonnegative function and B( ) is a positive function of p(f). This is generally the case because the instantaneous rate depends on the signal-to-interference-plus-noise ratio. The total service rate of UE j, which is denoted as $r_j$, is calculated by summing over all APs over the entire spectrum as follows:

$$r_j = \sum_{i \in N} r_{i \to j}. \quad \text{Eq. 6}$$

The fundamental resource allocation problem is to maximize the long-term utility by adapting the PSDs of all AP-UE links. Collecting the constraints of Eq. 1-6 above, P0 can be formulated as follows:

$$\underset{r,\{p(f)\}}{\text{maximize}}\; U(r) \quad \text{P0a}$$

$$\text{subject to } r_j = \sum_{i \in N} \int_0^1 q\left(\frac{A(p(f))}{B(p(f))}\right) f, \forall\, j \in K \quad \text{P0b}$$

$$\sum_{j \in K} |p_{i \to j}(f)|_0 \leq 1, \forall\, i \in N, \forall\, f \in [0,1] \quad \text{P0c}$$

$$\left(\sum_{j \in K} \int_0^1 [p_{i \to j}(f)]^\alpha f\right)^{\frac{1}{\alpha}} \leq P_{max}, \forall\, i \in N, \forall\, f \in [0,1]. \quad \text{P0d}$$

$$p_{i \to j}(f) \geq 0, \forall\, i \in N, j \in K, \forall\, f \in [0,1], \quad \text{P0e}$$

where U(r) is the network utility function. It is assumed herein that U( ) is a concave function. In fact, most conventional utility functions are concave such as the sum rate, the minimum user service rate (max-min fairness), and the sum log-rate (proportional fairness).

It is noted that P0 can be efficiently solved using the proposed methods described herein. The methods for solving P0 are elaborated upon below by narrowing down to specific functions for concreteness. Average (negative) packet delay is used as the network utility function:

$$u(r) = -\sum_{j \in K} \frac{\lambda_j}{(r_j - \lambda_j)^+}, \quad \text{Eq. 7}$$

where $\Delta_j$ is the homogeneous Poisson packet arrival rate of UE j, and the extended real-valued function $1/x^+ = 1/x$ if $x > 0$ and $1/x^+ = +\infty$ if $x \leq 0$. It can be seen that $1/x^+$ is convex on $(-\infty, +\infty)$. The choice of this utility function also assumes exponential packet length and a relatively conservative rate. If $r_j \leq \lambda_j$, the packet delay is infinite, and the system becomes unstable.

For the instantaneous rate function, the Shannon formula can be used in one embodiment. That is $$r_{i \to j} = \int_0^1 \log\left(1 + \frac{p_{i \to j}(f) g_{i \to j}}{n_0 + \sum_{l \in N: l \neq i} g_{l \to j} \sum_{q \in K} p_{l \to q}(f)}\right) f, \quad \text{Eq. 8}$$

where $g_{i \to j}$ is the average gain of link $i \to j$ which captures the effects of path loss and shadowing, and $$\sum_{l \in N: l \neq i} g_{l \to j} \sum_{q \in K} p_{l \to q}(f)$$

is the interference received from other APs operating over the same frequency f.

For the power constraints, the instantaneous power constraint is chosen by letting $\alpha \to \infty$ in Eq. 3, as follows:

$$0 \leq p_{i \to j}(f) \leq P_{max}, \forall\, i \in N, j \in K, \forall\, f \in [0,1]. \quad \text{Eq. 9:}$$

P0 can then be rewritten as P1, as follows:

$$\underset{r,\{p(f)\}}{\text{maximize}}\; U(r) \quad \text{P1a}$$

$$\text{subject to } r_j = \sum_{i \in N} + \int_0^1 \log\left(1 + \frac{p_{i \to j}(f) g_{i \to j}}{n_0 + \sum_{l \in N: l \neq i} g_{l \to j} \sum_{q \in K} p_{l \to q}(f)}\right) f, \quad \text{P1b}$$

$$\forall\, f \in K$$

$$\sum_{j \in K} |p_{i \to j}(f)|_0 \leq 1, \forall\, i \in N, \forall\, f \in [0,1] \quad \text{P1c}$$

$$0 \leq p_{i \to j}(f) \leq P_{max}, \forall\, i \in N, j \in K, \forall\, f \in [0,1]. \quad \text{P1d}$$

P1 can be difficult to solve directly due to two factors: (1) infinite problem size because of the continuous variable {p(f)}, and (2) the nonconvex constraint P1c. As discussed in more detail below, P1 is reformulated to a problem with a finite number of variables, and an efficient algorithm is then proposed to overcome the aforementioned difficulties.

The following proposition is described herein as Definition 1: A power allocation {p(f)} is said to be piecewise constant if the interval [0,1] can be partitioned into a finite number of sub-intervals such that, for every $i \in N$ and $j \in K$, $p_{i \to j}(f)$ is constant on each one of those sub-intervals. Additionally, the following proposition is referred to as Definition 2: A piecewise constant power allocation is said to be k-sparse if it suffices to partition [0,1] into k sub-intervals such that the PSDs are flat on all of those sub-intervals.

The feasible rate region R can be defined as follows:

$$R = \{r \in R^k : (P1b), (P1c), \text{ and } (P1d) \text{ hold for all } i \in N, j \in K, f \in [0,1]\}.$$  Eq. 10:

Theorem 1, which is proven below, is as follows: The optimal utility of P1 can be attained by a k-sparse piecewise constant power allocation. Theorem 1 implies that any optimal rate vector r can be achieved by dividing the entire spectrum into k constant-PSD intervals with bandwidths $\beta^1, \ldots, \beta^k$. To reformulate P1, $L = \{1, \ldots, k\}$ and power allocation over the j-th interval can be represented by a vector $p^j = (p_{1 \to 1}^j, \ldots, p_{k \to n}^j)$. Therefore, P1 can reformulated as P2:

$$2\underset{p,\beta}{\text{maximize}}\ U(r) \quad \text{P2a}$$

$$\text{subject to } r_j = \sum_{m \in L} \beta^m \sum_{i \in N} \log\left(1 + \frac{p_{i \to j}^m g_{i \to j}}{n_0 + \sum_{l \in N: l \neq i} g_{l \to j} \sum_{q \in K} p_{l \to q}^m}\right), \quad \text{P2b}$$

$$\forall j \in K$$

$$\sum_{j \in K} |p_{i \to j}^m|_0 \leq 1, \forall i \in N, \forall m \in L \quad \text{P2c}$$

$$\sum_{m \in L} \beta^m = 1, \quad \text{P2d}$$

$$0 \leq p_{i \to j}^m \leq P_{max}, \forall i \in N, j \in K, \forall m \in L \quad \text{P2e}$$

$$\beta^m \geq 0, \forall m \in L. \quad \text{P2f}$$

In P2, there are totally $k + k^2 n = O(k^2)$ variables. P2 is still difficult to solve because of the nonconvex constraints P2c. Moreover, for a large network that includes thousands of APs and UEs, P2 still has millions of variables, which prohibits the space and time complexities of solving P2. Described below are important facts and propositions that allow one to solve a simple case of P2 in which the utility function U(r) is an affine function of r. This technique can then be used to develop a scalable solution.

If the utility function U(r) is an affine function of r, one can arrive at the following proposition. Proposition 1: Suppose U(r) is an affine function of r. Then the maximum utility in P2 can be attained by letting each AP apply a flat power spectral density (PSD) over the entire spectrum (i.e., 1-sparse) to serve a single UE. To prove this proposition, the affine utility function can be written as:

$$U(r) = d + \sum_{j \in K} c_j r_j, \quad \text{Eq. 11}$$

for some constants d and ($c_j$). Therefore, P2 can be reformulated as P3, as follows:

$$2\underset{p,\beta}{\text{maximize}}\ d + \quad \text{P3a}$$

$$\sum_{m \in L} \beta^m \sum_{j \in K} c_j \sum_{i \in N} \log\left(1 + \frac{p_{i \to j}^m g_{i \to j}}{n_0 + \sum_{l \in N: l \neq i} g_{l \to j} \sum_{q \in K} p_{l \to q}^m}\right),$$

subject to (P2c), (P2d), (P2e), and (P2f).

One can let (p, β) be a feasible solution to P3, and can define $m^* \in L$ as a maximizer of $$\sum_{j \in K} c_j \sum_{i \in N} \log\left(1 + \frac{p_{i \to j}^m g_{i \to j}}{n_0 + \sum_{l \in N: l \neq i} g_{l \to j} \sum_{q \in K} p_{l \to q}^m}\right).$$

It can be seen that for any fixed power allocation p, the utility is always maximized by letting $\beta^{m*} = 1$. That is, by letting each AP apply a flat power spectral density over the entire spectrum to serve only one UE.

Now, P3 can be reformulated to remove the $l_0$ norm constraint (P2c) and to further reduce the number of variables. The variable $\Phi_i$ can denote the set of users who can potentially be served by AP i, and the variable $s_i$ can denote the UE to be served by AP i. Based on these variables and on Proposition 1 from above, P3 can be reformulated as P4 as follows:

$$2\underset{s,p}{\text{maximize}} \sum_{i \in N} c_{s_i} \log\left(1 + \frac{p_i g_{i \to s_i}}{n_0 + \sum_{l \in N: l \neq i} p_l g_{l \to s_i}}\right) \quad \text{P4a}$$

$$\text{subject to } 0 \leq p_i \leq P_{max}, \forall i \in N \quad \text{P4b}$$

$$s_i \in \Phi_i, \forall i \in N. \quad \text{P4c}$$

In P4, s refers to the UE decisions for APs. Specifically, $s_i$ is the index of the UE served by AP i, and it is possible for multiple APs to serve the same UE, i.e., $s_i = s_{i'}$ for $i \neq i'$. The variable $s_i = \emptyset$ if AP i serves no UE, and one can define $c_\emptyset = 0$. $p = (p_1, \ldots, p_n)$ as the vector that includes the constant PSDs of all APs over the entire spectrum. P4 has a total of 2n variables.

P4 can be viewed as a fractional programming problem, which has been well studied in prior works. A similar technique is used herein. First, it can readily be proven that P4 is equivalent to P5:

$$2\underset{s,p,\gamma}{\text{maximize}} \sum_{i \in N} c_{s_i} \log(1 + \gamma_i) - \sum_{i \in N} c_{s_i} \gamma_i + \sum_{i \in N} \frac{c_{s_i}(1 + \gamma_i) p_i g_{i \to s_i}}{n_0 + \sum_{l \in N} p_l g_{l \to s_i}} \quad \text{P5a}$$

$$\text{subject to } 0 \leq p_i \leq P_{max}, \forall i \in N \quad \text{P5b}$$

$$s_i \in \Phi_i, \forall i \in N. \quad \text{P5c}$$

When s and p are fixed, one can obtain the optimal γ as follows:

$$\gamma_i^* = \frac{p_i g_{i \to s_i}}{n_0 + \sum_{l \in N: l \neq i} p_l g_{l \to s_i}}. \quad \text{Eq. 12}$$

The equivalence can be established by noting that the objective (P5a) is concave in $(\gamma_i)_{i \in N}$, and that (P4a) is equal to (P5a) with γ* in it. Then, based on a proven theorem, it can be shown that P5 is equivalent to P6:

$$2\underset{s,p,\gamma,y}{\text{maximize}} \sum_{i \in N} c_{s_i} \log(1 + \gamma_i) - \sum_{i \in N} c_{s_i} \gamma_i + \quad \text{P6a}$$

$$\sum_{i \in N} \left(2 y_i \sqrt{c_{s_i}(1 + \gamma_i) p_i g_{i \to s_i}} - y_i^2 \left(n_0 + \sum_{l \in N} p_l g_{l \to s_i}\right)\right)$$

$$\text{subject to } 0 \leq p_i \leq P_{max}, \forall i \in N \quad \text{P6b}$$

$$s_i \in \Phi_i, \forall i \in N. \quad \text{P6c}$$

When all other variables are fixed, one can obtain the optimal y:

$$y_i^* = \frac{\sqrt{c_{s_i}(1+\gamma_i)p_i g_{i \to s_i}}}{n_0 + \sum_{l \in N} p_l g_{l \to s_i}}. \qquad \text{Eq. 13}$$

Similarly, the optimal power allocation for other fixed other variables is:

$$p_i^* = \min\left\{P_{max}, \frac{c_{s_i}(1+\gamma_i)g_{i \to s_i} y_i^2}{\left(\sum_{l \in N} y_l^2 g_{l \to s_i}\right)^2}\right\}. \qquad \text{Eq. 14}$$

Finally, since the utility function (P6a) can be decoupled in terms of each AP, the optimal UE decision variables s can be obtained through a simple search to find the user that maximizes the utility for each AP. This relation is depicted in Eq. 15 below:

$$s_i = \qquad \text{Eq. 15}$$

$$\begin{cases} \emptyset, \text{ if } \max_{j \in \Phi_i}\left\{2y_i\sqrt{c_j(1+\gamma_i)p_i g_{i \to j}} - y_i^2 \sum_{l \in N} p_l g_{l \to j}\right\} < 0 \\ \arg\max_{j \in \Phi_i}\left\{2y_i\sqrt{c_j(1+\gamma_i)p_i g_{i \to j}} - y_i^2 \sum_{l \in N} p_l g_{l \to j}\right\}, \text{otherwise} \end{cases}$$

The proposed joint power control and user association strategy for the affine utility function is summarized in the algorithm below. It can be readily verified that this algorithm is guaranteed to converge, with the utility (P4a) monotonically non-decreasing after each iteration. The total number of variables needed to be solved at each iteration is O(n), moreover, and each iteration in the algorithm is performed in closed form. As discussed in more detail below, all of these propositions can be combined to solve P1 for any utility functions.

Algorithm 1: Joint Power Control and User Association for the Affine Utility Function
  Initialization: Initialize s, p, γ.
  Repeat:
    Step 1: Update γ by Eq. 12;
    Step 2: Update y by Eq. 13;
    Step 3: Update s by Eq. 15;
    Step 4: Update p by Eq. 14;
  Until Convergence.

As noted above, the optimal solution to P1 can be obtained by partitioning the entire spectrum into at most k segments, and by having each AP apply a flat PSD to serve only one UE on each segment. Motivated by this property, Algorithm 2 is designed to identify one segment with power allocation and user association in each iteration by optimizing the first order approximation of the utility function using Algorithm 1. The identified segment is added to the set of collected segments which is used to re-optimize P2 in each iteration. Since the set of collected segments grows after each iteration, the utility function increases after each iteration until it converges.

Algorithm 2: Interactive Algorithm for Segment Pursuit
  Initialization: Pick full spectrum reuse power allocation denoted by $p^0$ as the initial feasible solution which gives a feasible rate vector of $r^0$; t←0; P←{$p^0$}.
  Repeat:
    Step 1: Solve P2 with the objective function being $\langle \nabla U(r^{(t)}), r \rangle$ using Algorithm 1, which results in $p^{t+1}$;
    Step 2: If $p^{t+1} \notin P$, P←P∪{$p^{t+1}$}, otherwise add an arbitrary new segment that is not in P, t←t+1.
    Step 3: Solve P2 given power allocations in P and obtain the rate vector $r^{(t)}$.
  Until Convergence.

Algorithm 2 can be interpreted as a Frank-Wolfe type Algorithm (also referred to as a conditional gradient algorithm). The main difference between Algorithm 2 and the conventional algorithm is that a line search is not performed. Rather, in each iteration of Algorithm 2, one segment in which each AP applies a flat PSD to serve at most one UE is found and added to the set P to re-optimize P2. The set P grows after each iteration because either a new segment is found or a random new segment is added. Based on Theorem 1, it is possible to find the global optimal solution for P1 after running Algorithm 2 for k iterations.

Figure 2:
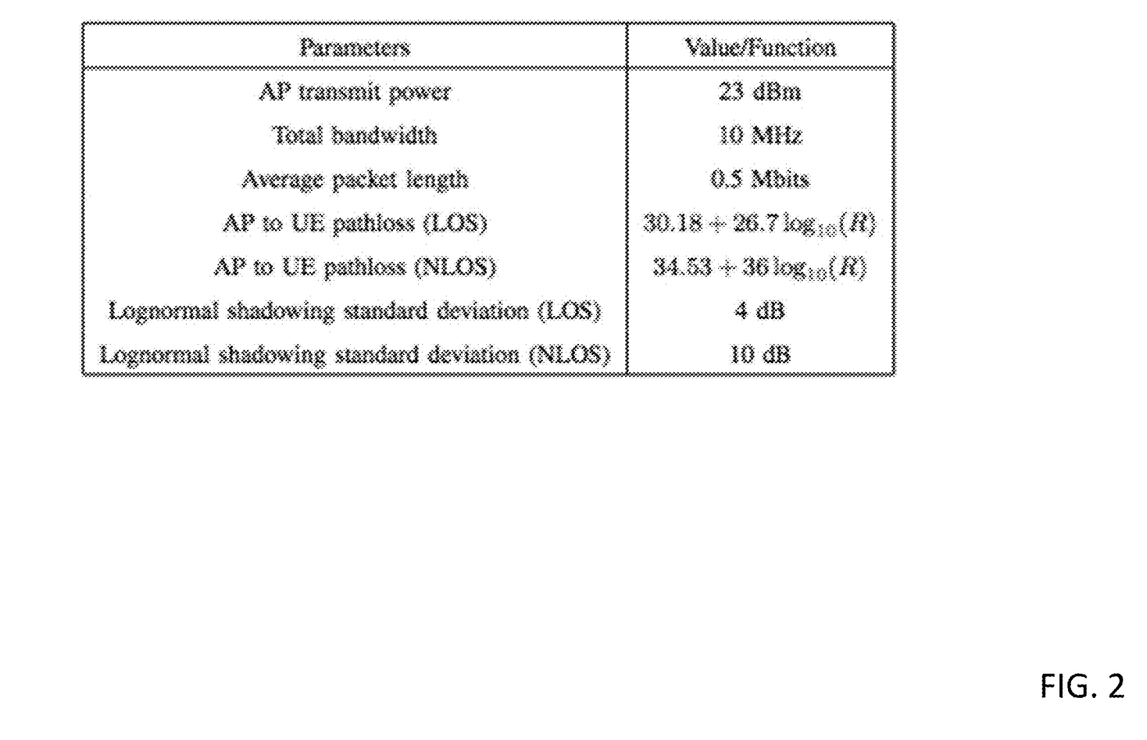
FIG. 2 depicts a table with parameter configurations used to test the performance gain of the proposed allocation scheme in accordance with an illustrative embodiment.

The performance gain of the proposed allocation scheme was investigated by comparing it with the following baseline schemes: (1) Full-spectrum-reuse+maximum reference signal receive power (MaxRSRP), in which every AP reuses all available spectrum with full transmit power and every UE is associated to the strongest AP in terms of the received power; (2) Full-spectrum-reuse+optimal user association, in which every AP reuses all available spectrum with full transmit power and user association is optimized for the utility; and (3) A pattern-pursuit algorithm which optimizes both spectrum allocation and user association assuming full transmit power at each AP. FIG. 2 depicts a table with parameter configurations used to test the performance gain of the proposed allocation scheme in accordance with an illustrative embodiment. The parameters in FIG. 2 are compliant with the LTE standard.

Figure 3:
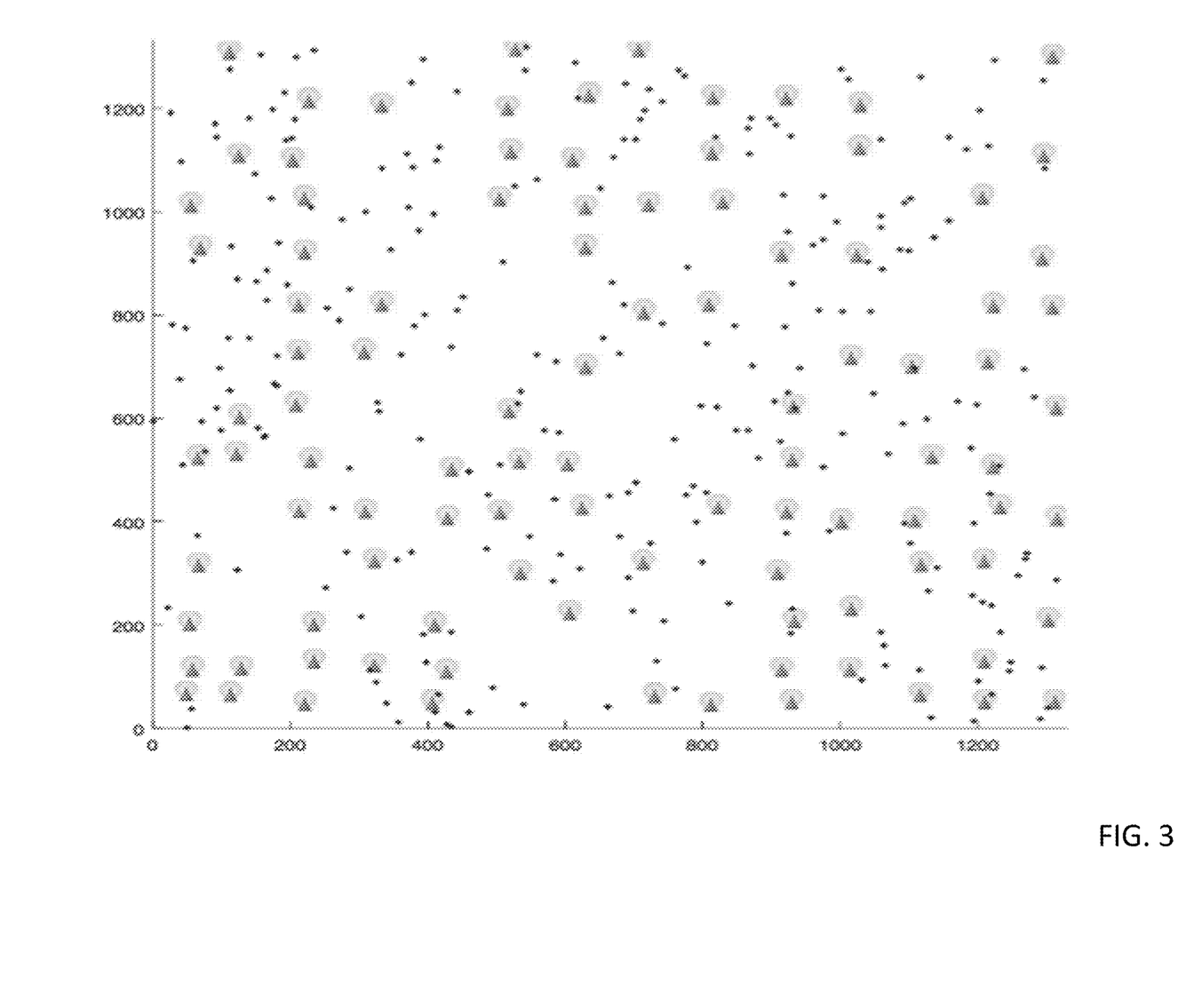
FIG. 3 depicts a test deployment in a medium scale network in accordance with an illustrative embodiment.
Figure 4:
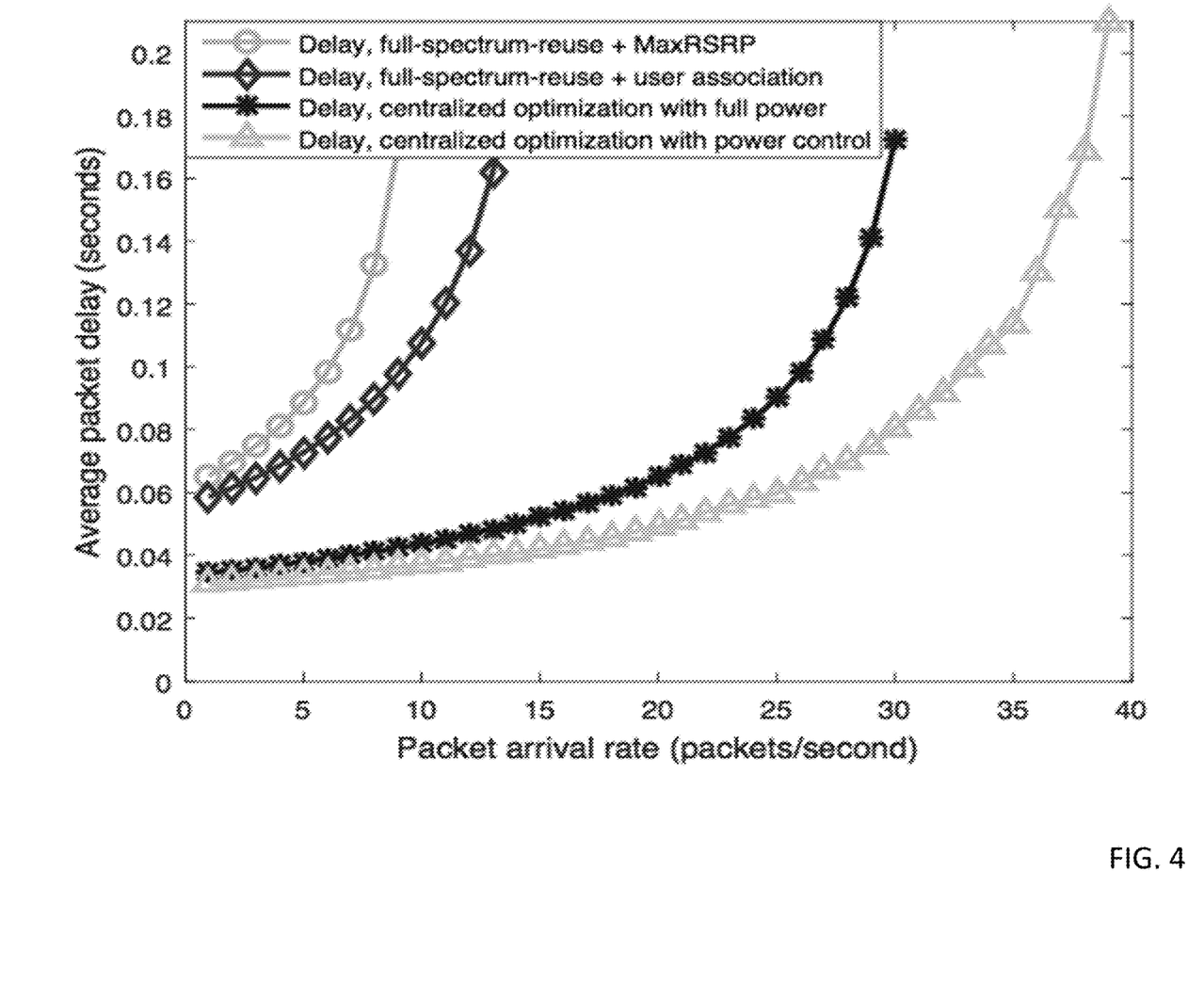
FIG. 4 depicts the objective of average packet delay versus traffic intensity curves for the deployment of FIG. 3 in accordance with an illustrative embodiment.

The performance of the proposed scheme was first tested in a network of medium size. FIG. 3 depicts a test deployment in a medium scale network in accordance with an illustrative embodiment. Specifically, 100 APs and 250 UEs were dropped over a 1330×1330 m² area as shown in FIG. 3. FIG. 4 depicts the objective of average packet delay versus traffic intensity curves for the deployment of FIG. 3 in accordance with an illustrative embodiment. From FIG. 4, it can be observed that as the average UE traffic increases to above 8, 13, and 30 packets/second, respectively, all three of the above-referenced baseline schemes fail to support all of the UEs. Conversely, the proposed solution has a significantly larger throughput (above 39 packets/second) as compared to the baseline schemes. The proposed solution also significantly reduces the delay, especially in the high traffic regime. The reason is that the proposed solution jointly optimizes the power allocation, spectrum allocation, and user association.

Figure 5:
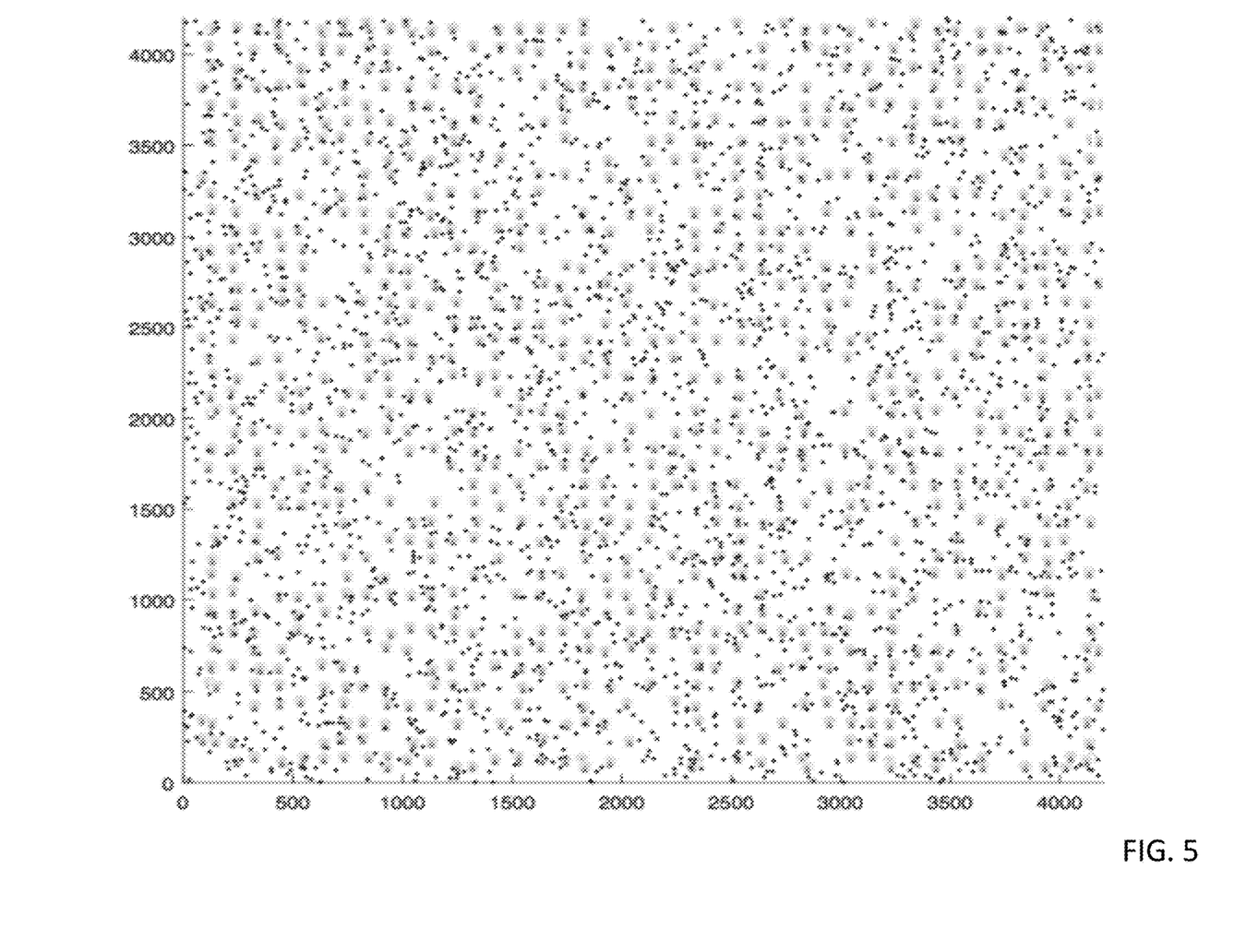
FIG. 5 depicts a test deployment in a large scale network in accordance with an illustrative embodiment.
Figure 6:
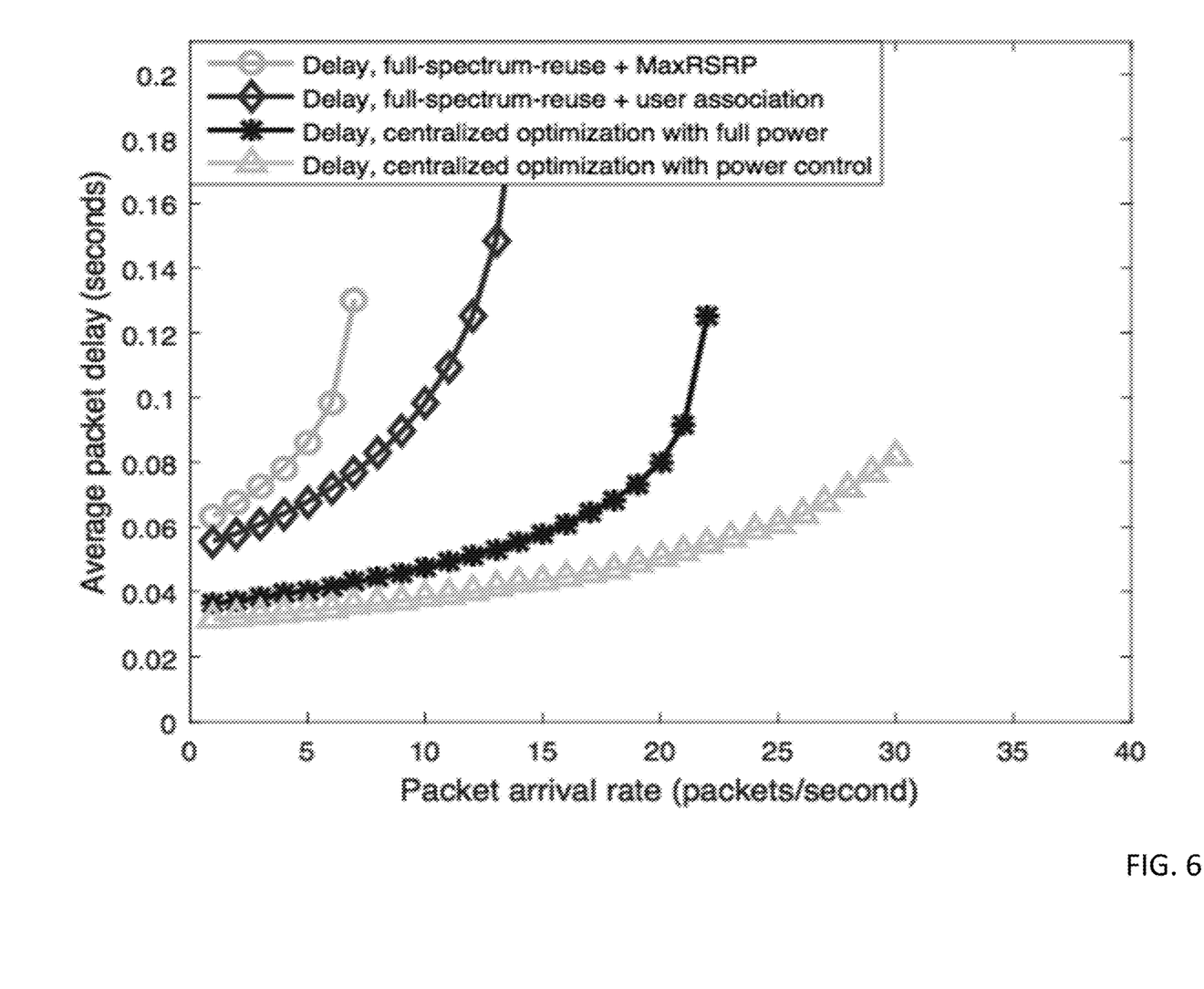
FIG. 6 depicts the objective of average packet delay versus traffic intensity curves for the deployment of FIG. 5 in accordance with an illustrative embodiment.

FIG. 5 depicts a test deployment in a large scale network in accordance with an illustrative embodiment. In this test scenario, the proposed allocation scheme is used to compute the allocation solution for a large network with the same density as the medium-scale network discussed above. The large network deployment depicted in FIG. 5 includes 1000 APs and 2500 UEs over a 4200×4200 m² area. FIG. 6 depicts the objective of average packet delay versus traffic intensity curves for the deployment of FIG. 5 in accordance with an illustrative embodiment. As depicted in FIG. 6, the proposed solution has significantly larger throughput (above 30 packets/second) than full-spectrum reuse with maxRSRP association (7 packets/second), full-spectrum reuse with optimal user association allocation (14 packets/second), and centralized optimization with full power (22 packets/second). The proposed solution also outperforms baseline schemes in delay, especially in the high traffic regime.

Thus, described herein is an improved solution to the joint resource allocation problem in large networks. A scalable reformulation has been developed by exploiting the hidden sparse structure of the network, and an efficient algorithm is proposed to solve the reformulated problem with guranteed convergence. Moreover, each iteration is performed in closed form, which makes centralized resource allocation practically feasible even for a very large network. Numerical results show substantial gains compared to all the other baseline schemes for networks with 1000 access points or more. The proposed algorithm applies to any concave utility functions such as sum rate, minimum user service rate (max-min fairness), and sum log-rate (proportional fairness).

Figure 7:
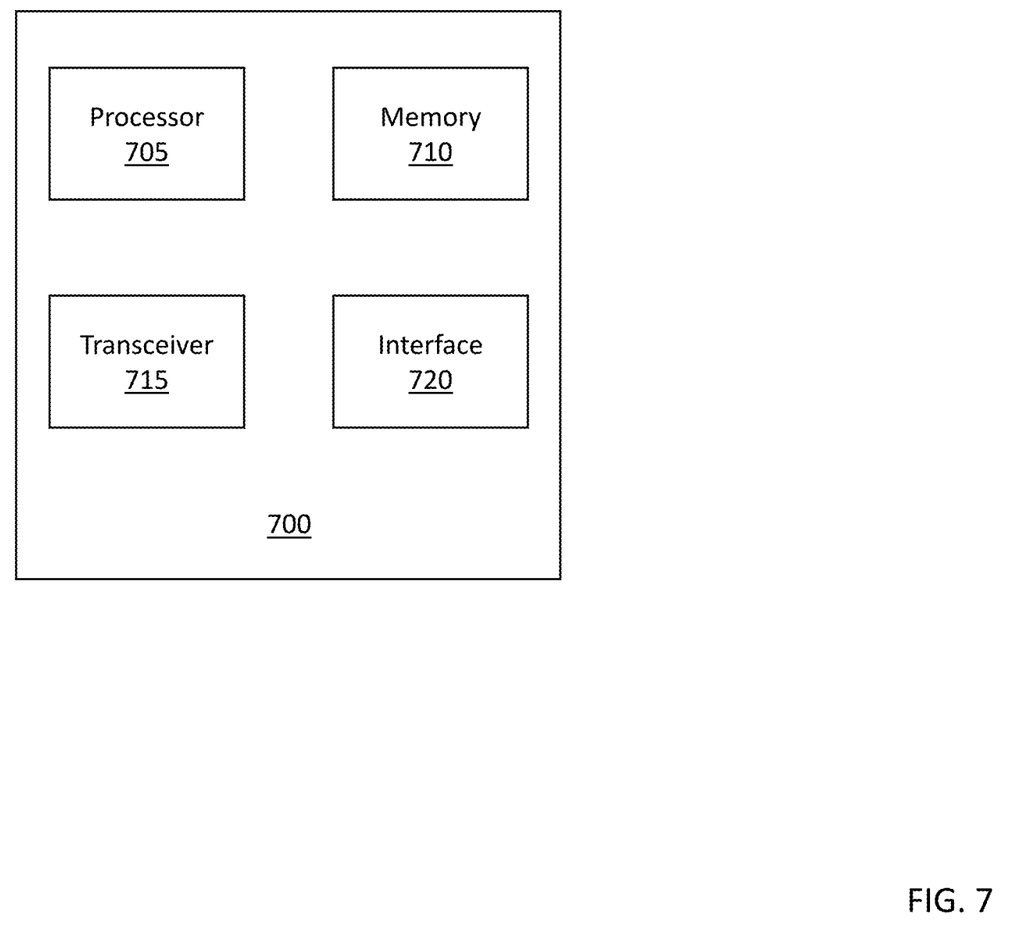
FIG. 7 is a block diagram depicting a central controller for the proposed system in accordance with an illustrative embodiment.

FIG. 7 is a block diagram depicting a central controller 700 for the proposed system in accordance with an illustrative embodiment. The central controller 700 includes a processor 705, a memory 710, a transceiver 715, and an interface 720. In alternative embodiments, the central controller 700 may include additional, fewer, and/or different components. The memory 710 can be any type of computer-readable medium that is configured to store computer-readable instructions to implement any of the operations, programs, and algorithms described herein. The processor 705 is configured to execute the computer-readable instructions stored in the memory 710. The processor 705 is also configured to control the transceiver 715 such that packets and other information can be received and transmitted by the central controller 700. The transceiver 715, which is used to receive/transmit information, can be any type of transceiver. The transceiver 715 can be in the form of a single component that both sends and receives, or alternatively the transceiver 715 can be in the form of a distinct receiver and a distinct transmitter. The interface 720 can be any type of input/output (I/O) component such as a display, keyboard, mouse, data port, etc. that allows an individual or another computing device to interact with the central controller 700.

Proof of Theorem 1

The above-discussed Theorem 1 can be proven by first proving that any point in the feasible rate region R given by Eq. 10 can be obtained with a (kn+1)-sparse piecewise constant power allocation. It is then further proven that a k-sparse piecewise constant power allocation suffices. For a network consisting of k UEs and n APs, there are totally kn links. The instantaneous spectral efficiency set $S_{link}$ and the achievable rate region of all links $R_{link}$ can be defined as follows:

$$S_{link} = \left\{ s \in R^{kn}: s_{(i-1)k+j} = \log\left(1 + \frac{p_{i \to j} g_{i \to j}}{n_0 + \sum_{l \in N: l \neq i} g_{l \to j} \sum_{q \in K} p_{l \to q}}\right), \right.$$
$$\left. \sum_{j \in K} |p_{i \to j}|_0 \leq 1, 0 \leq p_{i \to j} \leq P_{max}, \forall i \in N, j \in K \right\} \text{ and} \quad \text{Eq. 16}$$

$$R_{link} = \left\{ r_{kn \times 1}: r_{i \to j} = \int_0^1 \log\left(1 + \frac{p_{i \to j}(f) g_{i \to j}}{n_0 + \sum_{l \in N: l \neq i} g_{l \to j} \sum_{q \in K} p_{l \to q}(f)}\right) f, \right.$$
$$\sum_{j \in K} |p_{i \to j}(f)|_0 \leq 1, 0 \leq p_{i \to j}(f) \leq P_{max},$$
$$\left. \forall i \in N, j \in K, f \in [0, 1] \right\} \quad \text{Eq. 17}$$

The instantaneous spectral efficiency set $S_{link}$ is the set of all spectral efficiencies achievable by power allocation at any frequency. By the standard convexity argument, it is apparent that the achievable rate region of all links $R_{link}$ is the convex hull of the instantaneous spectral efficiency set $S_{link}$, i.e., $R_{link}=\text{conv}\{S_{link}\}$. Then by the Caratheodory theorem, it can be proven that the number of elements in $S_{link}$ that is needed to construct an arbitrary data rate vector $r_{kn \times 1}=(r_{i \to j}, \forall i \in N, \forall j \in K)$ in $R_{link}$ is at most kn+1. In other words, any achievable rate vector can be obtained with at most kn+1 piecewise constant power allocations. That is, for any $(r_{i \to j})_{i \in N, j \in K} \in R_{link}$, it follows that:

$$r_{i \to j} = \sum_{m=1}^{kn+1} \beta^m \log\left(1 + \frac{p_{i \to j}^m g_{i \to j}}{n_0 + \sum_{l \in N: l \neq i} g_{l \to j} \sum_{q \in K} p_{l \to q}^m}\right), \quad \text{Eq. 18}$$

for some piecewise constant power allocations $\{p_{i \to j}^m\}_{i \in N, j \in K, m=1,2,\ldots,kn+1}$ and corresponding bandwidths $\{\beta^m\}_{m=1,2,\ldots,kn+1}$ with $\sum_{m+1}^{kn+1} \beta^m = 1$.

Next, the number of piecewise constant power allocations are further reduced to obtain an arbitrary achievable rate vector. Let $r_{k \times 1}=(r_j, \forall j \in K)$ be an element in the set R. By definition, there exists a vector $r'_{kn \times 1} \in R_{link}$ such that $$r_j = \sum_{i \in N} r'_{i \to j}, \forall j \in K.$$

Based on this portion of the proof, it is known that the vector r' can be constructed using kn+1 piecewise constant power allocations denoted as $\{p_{i \to j}^m\}_{i \in N, j \in K, m=1,2,\ldots,kn+1}$. Then for each $j \in K$, it can be seen that:

$$r_j = \sum_{i \in N} r'_{i \to j} \quad \text{Eq. 19}$$

$$\sum_{i \in N} \sum_{m=1}^{kn+1} \beta^m \log\left(1 + \frac{p_{i \to j}^m g_{i \to j}}{n_0 + \sum_{l \in N: l \neq i} g_{l \to j} \sum_{q \in K} p_{l \to q}^m}\right) \quad \text{Eq. 20}$$

$$\sum_{m=1}^{kn+1} \beta^m \sum_{i \in N} \log\left(1 + \frac{p_{i \to j}^m g_{i \to j}}{n_0 + \sum_{l \in N: l \neq i} g_{l \to j} \sum_{q \in K} p_{l \to q}^m}\right) \quad \text{Eq. 21}$$

A new set can be defined as follows:

$$T = \left\{ t_{k\times 1}: t_j = \sum_{i\in N} \log\left(1 + \frac{p_{i\to j} g_{i\to j}}{n_0 + \sum_{l\in N: l\neq i} g_{l\to j} \sum_{q\in K} p_{l\to q}}\right) \sum_{j\in K} |p_{i\to j}|_0 \leq 1, \right.$$

$$\left. 0 \leq p_{i\to j} \leq P_{max}, \forall\, i \in N, j \in K \right\} \quad \text{Eq. 22}$$

It is apparent that the vector $r_{k\times 1}$ is in the convex hull of T. Therefore, by the Caratheodory theorem, it can be proven that the number of elements in T that is needed to construct an arbitrary data rate vector $r\in R$ is at most k+1. Moreover, r is either on the boundary of the convex hull of T or it is an interior point. In either case, there exists r* on the boundary that dominates r in every dimension. Therefore, the number of elements in T that is needed to construct an optimal rate vector $r_{k\times 1}$ in R is at most k, which implies that an optimal rate vector $r_{k\times 1}$ can be achieved by dividing the spectrum [0,1] into k intervals with lengths $\beta_1, \ldots, \beta_k$ and assigning power vectors $p^1, \ldots, p^k$ to these intervals, where $p^m = \{p_{i\to j}^m\}_{i\in N, j\in K}$.

In an illustrative embodiment, any of the operations described herein may be performed by a computing system that includes a memory, processor, user interface, transceiver, and any other computing components. The operations can be stored as computer-readable instructions on a computer-readable medium such as the computer memory. Upon execution by the processor, the computer-readable instructions are executed as described herein.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system for allocating resources in a communications network, the system comprising:
   a plurality of access points, wherein each access point in the plurality of access points is in communication with one or more user devices; and
   a central controller in communication with the plurality of access points, wherein the central controller is configured to:
   receive traffic information and channel information for access point—user device links in the communications network; and
   determine a joint resource allocation based at least in part on the received traffic and channel information and at least in part on an algorithm, wherein the algorithm is derived based on a non-convex infinite-size joint spectrum allocation, user association, and power allocation problem; and
   transmit the joint resource allocation to the plurality of access points, wherein the joint resource allocation comprises spectrum allocation, user association, and power allocation.

2. The system of claim 1, wherein the central controller is further configured to receive interference information for the access point—user device links in the communications network.

3. The system of claim 2, wherein the central controller determines the joint resource allocation based at least in part on the interference information.

4. The system of claim 1, wherein the central controller is further configured to receive an intensity of independent homogeneous Poisson traffic intended for the one or more user devices.

5. The system of claim 4, wherein the central controller determines the joint resource allocation based at least in part on the intensity of independent homogenous Poisson traffic intended for the one or more user devices.

6. The system of claim 1, wherein the plurality of access points are configured to implement the joint resource allocation.

7. The system of claim 6, wherein each of the plurality of access points is configured to apply a continuous power spectral density over a frequency band used in the communications network.

8. The system of claim 1, wherein the algorithm is based on a reformulation of the non-convex infinite-size joint spectrum allocation, user association, and power allocation problem into an optimization problem with finite size.

9. The system of claim 1, wherein the central controller is configured to model average channel conditions based on path loss and statistics of small scale fading.

10. The system of claim 1, wherein the central controller is further configured to determine a power spectral density for each of the access point—user device links over an entire frequency spectrum used by the communications network.

11. The system of claim 10, wherein the central controller determines the joint resource allocation based at least in part on the determined power spectral densities.

12. A method for allocating resources in a communications network, the method comprising:
   receiving, by a central controller and from a plurality of access points in communication with the central controller, traffic information and channel information for access point—user device links in a communications network, wherein each access point in the plurality of access points is in communication with one or more user devices;
   deriving an algorithm based on a non-convex infinite-size joint spectrum allocation, user association, and power allocation problem;
   determining a joint resource allocation based at least in part on the received traffic and channel information and at least in part on the algorithm; and transmitting the joint resource allocation to the plurality of access points, wherein the joint resource allocation comprises spectrum allocation, user association, and power allocation.

13. The method of claim 12, further comprising receiving interference information for the access point—user device links in the communications network.

14. The method of claim 13, further comprising determining, by the central controller, the joint resource allocation based at least in part on the interference information.

15. The method of claim 12, further comprising receiving, by the central controller, an intensity of independent homogeneous Poisson traffic intended for each of the one or more user devices.

16. The method of claim 15, further comprising determining, by the central controller, the joint resource allocation based at least in part on the intensity of independent homogenous Poisson traffic intended for each of the one or more user devices.

17. The method of claim 12, further comprising implementing, by the plurality of access points, the joint resource allocation.

18. The method of claim 17, wherein implementing the joint resource allocation comprises, in part, applying a continuous power spectral density over a frequency band used in the communications network.

19. The method of claim 12, further comprising determining, by the central controller, a power spectral density for each of the access point—user device links over an entire frequency spectrum used by the communications network.

* * * * *